United States Patent

Lemelson

[11] 4,213,162
[45] Jul. 15, 1980

[54] MAGNETIC TAPE CARTRIDGE TRANSDUCING APPARATUS AND METHOD

[76] Inventor: Jerome H. Lemelson, 85 Rector St., Metuchen, N.J. 08840

[21] Appl. No.: 865,951

[22] Filed: Dec. 30, 1977

[51] Int. Cl.$^2$ .................. G11B 5/52; G11B 15/60; G11B 23/04
[52] U.S. Cl. .................................. 360/85; 360/132
[58] Field of Search .................. 360/85, 132, 81–84, 360/93, 96

[56] References Cited

U.S. PATENT DOCUMENTS

| | | | |
|---|---|---|---|
| 3,555,245 | 1/1971 | Lemelson | 235/61.11 |
| 3,588,378 | 6/1971 | Protas | 360/85 |
| 3,761,643 | 9/1973 | Keeler | 360/85 |
| 3,766,328 | 10/1973 | Warren | 360/85 |
| 4,025,959 | 5/1977 | Warren | 360/85 |

*Primary Examiner*—Alfred H. Eddleman

[57] ABSTRACT

An apparatus and method are provided for transducing information with respect to magnetic tape supplied and supported within a magazine or cartridge. In one form, the tape in the magazine extends from a supply reel to a take-up reel and a free length thereof between the supply and take-up reel is exposed to the exterior of the magazine as it is driven past a semi-cylindrical supporting surface forming part of the magazine. Either by movement of the magazine and/or a drum-shaped support for a number of magnetic transducers, into engagement with each other, the tape is made to conform to the semi-cylindrical surface support of the magazine and to the cylindrically shaped surface of the drum supporting the transducers. Thereafter the tape is driven from the supply to the take-up reel against or closely adjacent to the drum-shaped transducer support in a manner such that one or more magnetic heads supported by the drum scan transverse tracks of the magnetic tape. In so doing, high speed magnetic recording and/or reproduction of information, such as video information generated in the megahertz frequency range may be recorded along the transverse tracks of the tape without the need for driving the tape at extremely high speeds.

14 Claims, 7 Drawing Figures

MAGNETIC TAPE CARTRIDGE TRANSDUCING APPARATUS AND METHOD

SUMMARY OF THE INVENTION

This invention relates to an apparatus and method for transducing information with respect to a record tape, such as a magnetic recording tape provided within a magazine which is removably securable to a transducing apparatus containing one or more transducers for transversely scanning the tape. In one form a plurality of magnetic transducers are supported by a drum which rotates the transducers about an axis which is parallel to the face of the tape during the transducing operation and is angulated with respect to the tape so that the transducers transversely scan the tape. The transducing operation is effected without removing the tape from the magazine by providing an arcuate support behind the tape as part of the tape containing magazine. A free length of the tape between the take-up and supply reels of the magazine extends past an opening in an end wall of the magazone and the tape support extends adjacent to and inwardly of the tape. When the magazine is properly positioned on the magnetic recording apparatus, and is predeterminately moved or guided in movement towards the drum supporting the transducers, the surface of the drum engages the free length of the tape and urges the tape against the conforming cylindrical guide for the tape deforming the tape therebetween so that when the drum is power rotated thereafter, its magnetic heads will alternately scan transverse tracks of the tape either while the tape is held stationary between or driven between its supply and take-up reels in the magazine.

In another form, the drum supporting the magnetic heads is moved into a recess in the walls of the magazine to engage a free length of tape extending across the recess and to urge the tape against a supporting surface disposed behind the tape and conforming to the surface of the drum so as to predeterminately position the tape around a substantial portion of the drum and locate it for recording and/or reproduction purposes effected by rotation of the drum and magnetic transducers supported at the surface of the drum.

Various techniques have been developed for magnetically recording and/or reproducing with respect to flexible magnetic tape supplied by a magazine or cartridge. As set forth in my U.S. Pat. No. 3,555,245, the magnetic tape of a cartridge may be drawn out of the cartridge or away from its normal position with respect to the cartridge to cause the tape to engage one or more magnetic transducers. Other techniques have been employed wherein one or more manipulating devices are automatically operated to pull magnetic tape out of a magazine or cartridge and helically wind the tape about a drum supporting a magnetic transducer to permit transducing operations to be performed thereafter. Such tape manipulation and positioning means is obviously relatively complex in both structure and operation, and a delay is experienced during the time it takes for the manipulation means to spirally wind or otherwise dispose the tape against one or more magnetic transducers.

Accordingly, it is a primary object of this invention to provide a new and improved apparatus and method for recording signals with respect to a magnetic tape supported within a magazine.

Another object is to provide an apparatus and method for transversely scanning a magnetic tape supplied within a magazine wherein the need to remove the tape from the magazine is eliminated.

Another object is to provide a simple mechanism and method for recording information on magnetic tapes supported within magazines without the need for removing the tape from the magazine or unduly stressing the tape to preposition it with respect to a transducing and drive means.

Another object is to provide a magnetic tape transducing apparatus employing a magazine containing magnetic tape for use in recording and reproduction of high frequency information such as video information, without the need for driving the tape at high speed and removing the tape from the magazine in order to effect the transducing operation.

Another object is to provide a magnetic transducing apparatus and method employing rotating magnetic heads supported by a drum wherein the heads and tape are simply and easily positionable with respect to each other to permit video recordings to be made and reproduced from the tape without difficulty.

Another object is to provide a magnetic recording apparatus for recording video information and playing back such information through a video monitor wherein the video information may be easily transduced with respect to a magnetic tape supplied by a magazine without the need to remove the tape from the magazine and without the need to drive the tape at high speed within the magazine as a result of transverse scanning of the tape which is effected without the use of a complex tape transport.

With the above and such other objects in view as may appear herafter more fully, the invention consists of the novel constructions, combinations and arrangements of parts which will be more fully described and illustrated in the accompanying drawings, but it is to be understood that changes, variations and modifications may be restored to which fall within the scope of the invention as claimed.

In the drawings:

FIG. 1 is a plan view of a magnetic transducing apparatus including a magnetic cartridge or magazine containing supply and take-up reels of magnetic tape supported therein and guide and transport means for guiding the tape past a support for the tape which forms part of the magazine and causes the tape to conform to the cylindrical surface of a drum containing one or more magnetic transducers which operate to transversely scan the tape when the drum and magazine support are operatively located and the tape is disposed therebetween;

FIG. 1A is a partial plan view of the magazine of FIG. 1;

FIG. 2 is a side view in cross-section of a portion of the apparatus of FIG. 1 just prior to operatively locating the transducer supporting drum and magazine; and FIG. 3 is a side view in cross-section of a portion of the apparatus of FIG. 1 in which the drum operatively engages the magnetic tape of the magazine against a cylindrical support therefor so as to urge the tape against the drum and make it conform to the surface of the drum for transducing purposes.

Figure 1A:
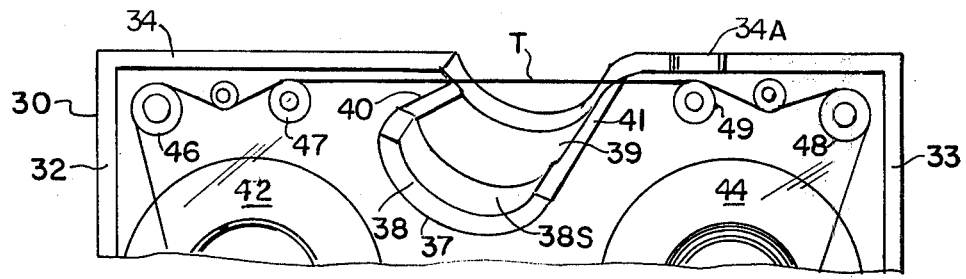
Figure 1:
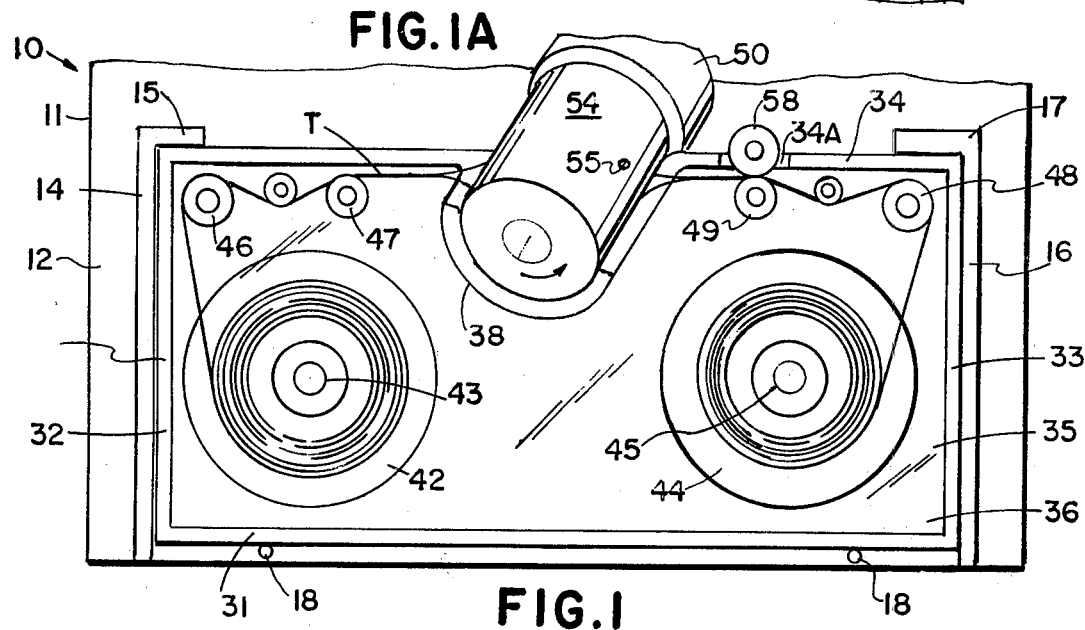

In FIG. 1 is shown an apparatus 10 which is operable for magnetically recording information, such as video picture signals, with respect to a magnetic tape T supported within a magazine or cartridge 30. As illustrated, magazine 30 is defined by a housing having parallel major side walls 35, 36 front and rear end walls 31, 34 and side end walls denoted 32, 33. The housing 30 is substantially a rectangular parallelepiped with the exception of a portion of the front end wall 34 which has a recess formed therein, denoted 37, and defining a somewhat semi-cylindrical surface 38 which conforms to the surface 54S of a drum 54 supporting one or more magnetic transducers 55. When the magazine 30 is operatively located as illustrated in FIG. 1 and in FIG. 3, the magnetic tape T is disposed between the drum and the surface 38 permitting the transducers 55 supported by the drum to transversely scan the tape as the drum is rotated. Recess 37 may be a molded portion of the wall 34.

Figure 2:
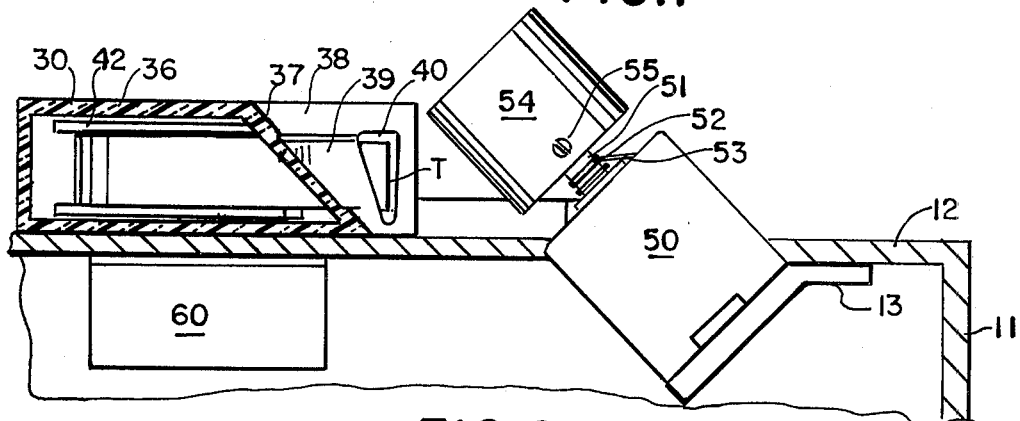
Figure 3:
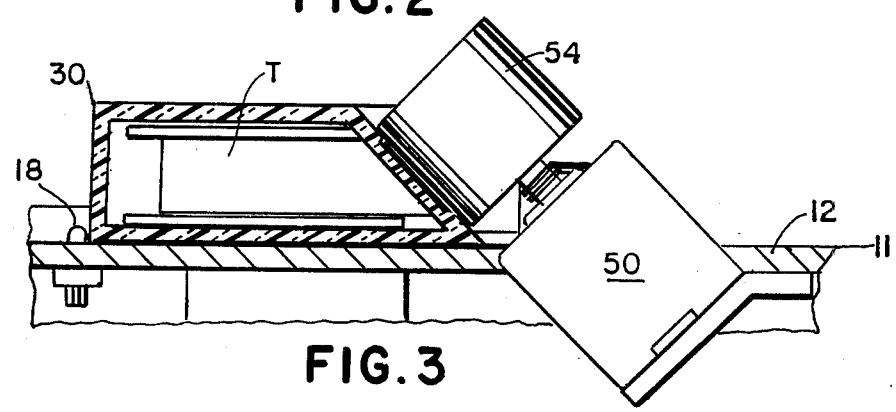

The apparatus 10 includes a support 11 in the configuration of a rectangular housing containing suitable magnetic recording and reproduction electronic components (not shown) supported therein and operatively connected by suitable commutating means to a magnetic heads of the drum 54 which is supported on a shaft 51 extending from a constant speed electrically operated gear motor 50 supported, as shown in FIGS. 2 and 3, by a bracket 13 secured to the top wall 12 of housing 11 within the housing. Guide means for guiding the magazine 30 to an operative position as shown in FIG. 1 include a pair of longitudinally extending strip-like projections 14 and 16 which are secured to or form part of the top wall 12. Extensions 15 and 17 of the projections 14 and 16 define the forward position of the magazine and secure the magazine to the upper surface of the top wall 12 at such operative position in cooperation with two spring loaded pins denoted 18 which project upwardly from the upper surface near the receiving end of the housing 11 as illustrated in FIGS. 1 and 3.

The magnetic tape containing magazine 30 rotationally supports the supply reel 42 on a shaft or hub 43 which is supported by either or both the major side walls 35 or 36 of the magazine. A take-up reel 44 is similarly supported on a shaft or hub 45 at the other end of the magazine. Notations 46, 47, 48 and 49 refer to small wheels or guides which are rotatably supported by the walls of the magazine 30 and which guide the tape T between the supply and take-up reels 42 and 44 past the recessed portion 37 of the end wall 34.

The recessed portion 37 is defined by a side wall 38 having a substantially cylindrical inside surface 38S with openings 39 and 40 therein to permit the tape T to extend across the surface 38S, as illustrated in FIG. 2, when it is tensioned between the supply and take-up reels and prior to being engaged by the cylindrical surface 54S of the drum 54 against surface 38S. By moving the magazine 30 along the guides 14 and 16 in the direction of the drum 54, the wall 37 of the recessed portion of the magazine may be brought into close proximity with the surface of the drum whereby the drum engages and cylindrically deforms the tape T to make it conform to the narrow annular volume between the drum and the surface 38S. In such condition and when so positioned with respect to the drum, the tape T may be transversely scanned by the magnetic heads 55 at their operative ends located at the surface of the drum. If two heads 55 are so supported by the drum, they may be disposed diametrically opposite each other. If three heads are so supported, they may be disposed at equal angles (120°) around the drum for alternately scanning the tape when conforming to the surface of the drum, as the drum rotates against the tape.

The tape may be guided in its path against the surface 38S of the wall 38 by a recess 37 molded or otherwise formed in the inside surface of said wall, which recess defines a channel having a width which is substantially the width of the tape which channel receives and laterally aligns the tape along the inside surface 38S of the wall 38.

It is noted that the axis of rotation of the drum 54 defined by shaft 51 of gear motor 50, extends upwardly and at a lateral angle with respect to the longitudinal axis of the housing 30 so that the magnetic heads 55 supported by the drum scan transversely across the tape at an acute angle to the longitudinal axis of the tape when the tape is disposed against the surface of the drum as it is guided across the surface 38S of the side wall 38 of the recess 37.

Notation 60 refers to a subhousing supported beneath the top wall 12 of the housing 11, which subhousing contains mechanisms for coupling to the hubs 43 and 45 of the reels 42 and 44 of a magazine or cartridge after it is disposed at the operative location illustrated in FIG. 1, and drive means for such coupling means, such as respective gear motors which are selectively operable to drive the tape to and from the supply and take-up reels in accordance with the selective operation of such motors. Such drive and coupling means is known in the art and may be found in such U.S. patents as Nos. 3,636,273; 4,008,490; and 4,012,790 which illustrate means for advancing a tape drive motor into engagement with the hub of a reel supported within a magazine containing tape after the magazine is predeterminately positioned on a magnetic recording apparatus. U.S. Pat. No. 3,555,245 also illustrates such a coupling and drive means.

Also illustrated in FIG. 1 is a motor driven capstan wheel 58 which is rotatably supported adjacent drum 54 and is adapted to engage the tape T against the idler wheel 49 of the magazine 30 for constant speed driving of the tape toward the take-up reel 44 to provide the longitudinal movement of the tape necessary during a recording or playback operation in which motion picture video signals are recorded on or played back from the tape. The capstan wheel 58 extends through a recess or opening 34A in the end wall 34 of the housing of the magazine 30, as illustrated, to engage the tape against the idler or depressor wheel 49.

Notations 52 and 53, shown in FIG. 2, refer respectively to a plurality of slip rings insulatably supported on the shaft 51 of the gear motor 50 and brushes 53 supported by the housing of the motor 50 for commutating electrical energy and video signals with respect to the magnetic heads 55 supported by the drum 54 to permit the proper recording and reproduction operations to be performed with respect to the tape T scanned by the transducers 55 as the drum rotates.

The apparatus illustrated in FIGS. 1-3 also includes, although not shown, suitable control means for controlling the operation of the motor driving the supply and take-up reels to properly maintain tension of the tape therebetween and manual switching means for selectively controlling all of the motors described to permit the tape to be properly driven and scanned in the recording and reproduction operations and to be rewound on the supply reel, fast driven forward or in reverse or otherwise driven depending on the desired transducing function or functions. The controls also include means for automatically coupling the drive means to the reels to effect an automatic transducing operation thereafter and selectively retracting same to permit the magazine 30 to be removed from the housing at the end of a transducing operation.

Modified forms of the invention illustrated in FIGS. 1-3 include a transducing apparatus in which a magazine or cartridge of the type illustrated is prepositioned and retained at a first location on or within a housing and thereafter a rotating drum of the type shown together with its support is moved in a manner to cause the surface of the drum to engage a free length of the tape aligned therewith against a semi-cylindrical surface of a support for the tape to permit tape movement and transducing of the type described. Drum positioning and movement may be effected either by a manually operated mechanism or a mechanism which is power driven by one or more motors to properly position the drum with respect to the tape and magazine as illustrated in FIG. 3, for example. In such an arrangement, the drive wheel 58 would be supported by the support for the drum motor 50 to permit the drive wheel to move towards and to engage the tape against the idler or depressor wheel 49 supported by the magazine.

In yet another embodiment, the supporting surface 38 for the tape may be part of a structure which is supported by and assembled to the housing 11 and which moves upwardly through an opening in the major side 35 of the magazine 30 after the magazine is predeterminately positioned on the recorder housing or which is fixedly supported by the housing 11 and positioned within the magazine housing when the housing is moved downwardly against the top wall 12 as guided by the guide strips 14 and 16 to its operative location thereon as illustrated.

In yet another form, it is noted that the drum 54 may be located to be inserted into a cylindrically walled guide therefor forming part of or supported between the walls 35 and 36 of the magazine 30, preferably between the reels 42 and 44 wherein the tape is disposed against such guide either by extending halfway, therearound or is helically wrapped around the guide to permit a single head supported by the drum to transversely scan transverse tracks of the tape as it is driven against the guide between the supply and take-up reels in the magazine. Such a guide may be of a cylindrical configuration if helical tape winding is effected therearound which cylindrical configuration may have its longitudinal axis at right angles to the walls 35 and 36, or may be angulated with respect thereto depending on the location and angle of the drum supporting the magnetic head or heads. An opening in the cylindrical side wall of such guide is provided surrounded by a wall configuration for the guide which is operable to guide the tape into engagement with the cylindrical support for the magnetic transducer or transducers when operatively located therein to permit a transducing operation to be effected between the transducer or transducers and the tape which is guided against or around the cylindrical guide as it is driven from the supply to the take-up reel in the magazine.

It is also noted that as part of the magazine or cassette structures illustrated as in FIGS. 1 and 1A, idler wheels or pins may be supported by or adjacent the sidewall 38 to suitably guide the tape t into the recess and along the surface 38S when forced thereagainst by the drum 54 so as to prevent damage to the tape during the transducing operation. In FIG. 1A the side wall of the recessed portion 37, particularly the tape guiding portion 42 thereof, is smoothly arcuately shaped or curved to smoothly guide the tape therealong and therefrom to prevent creasing or tearing of the tape. The surface 38S may contain, by way of coating or lining, a low friction material such as polytetrafluorethylene and/or a resilient material such as an elastomer or foamed plastic which is compressed when the tape is pressed thereagainst by the drum 54 so as to exert a force on the tape against the drum and provide a low friction surface for sliding movement of the tape thereacross as it is driven in an arcuate path around part of the drum 54.

Figure 4:
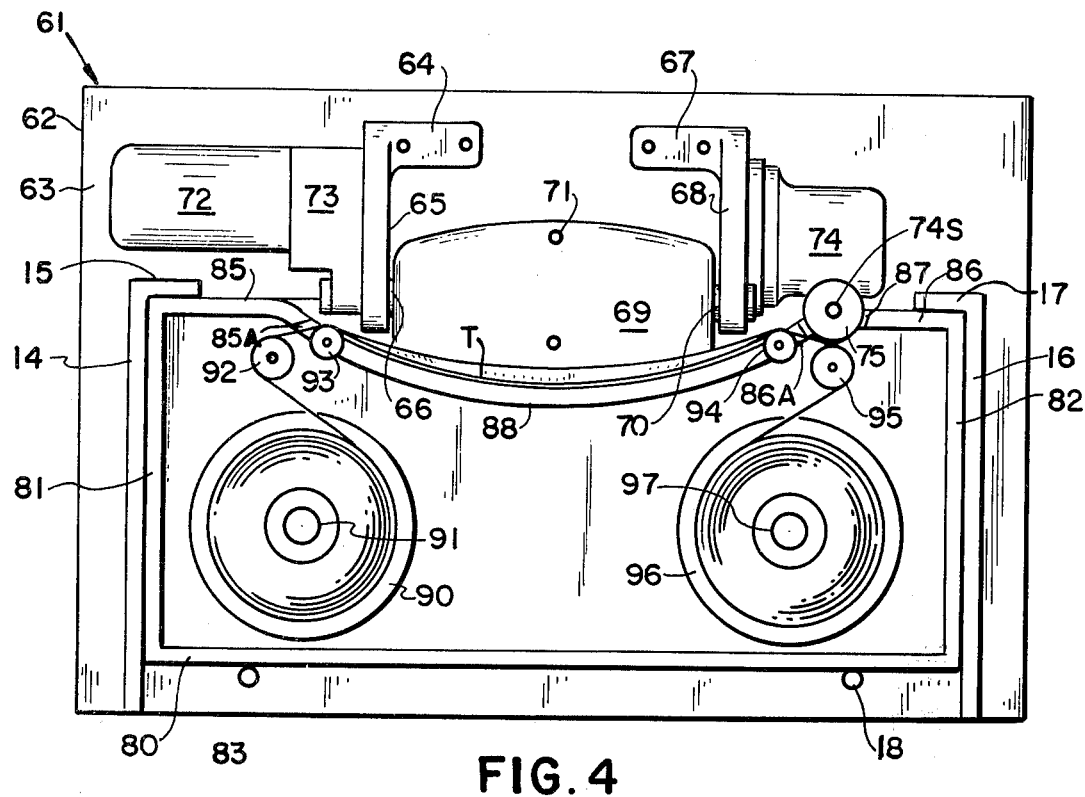
FIG. 4 is a plan view of a magnetic transducing apparatus and a magazine or cassette operatively located thereon with a portion of the magnetic tape thereof longitudinally engaged against a drum containing magnetic transducers for transversely scanning the tape.
Figure 5:
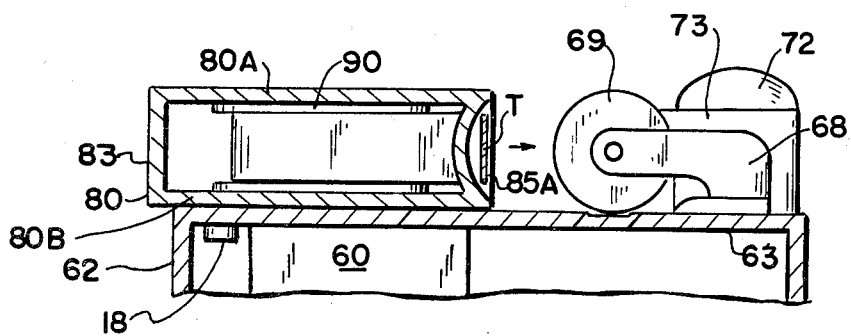
FIG. 5 is a side view of the apparatus of FIG. 4 with parts broken away and sectioned for clarity, showing the magazine as it is being moved towards it operative position thereon
Figure 6:
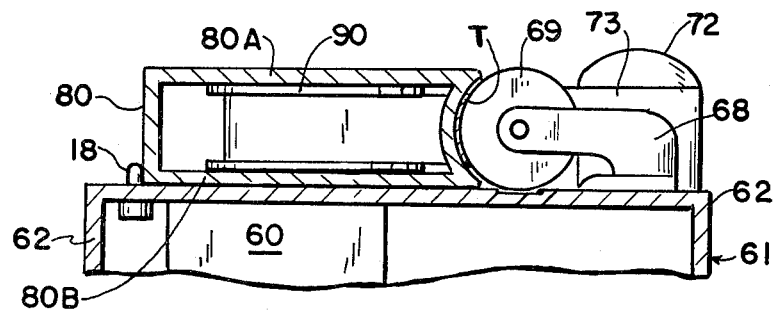
FIG. 6 is a side view of the apparatus of FIG. 4 with parts broken away and sectioned for clarity with the magazine at its operative position and the tape of the magazine longitudinally engaged as in FIG. 4.

FIGS. 4 to 6 illustrate details of a magnetic tape cassette recorder and reproduction unit 61 defined by a housing 62 supporting on its top wall 63 a receiving means, as described in FIGS. 1-3, for prepositioning and retaining a magnetic tape containing magazine 80 against a drum with the tape of the magazine disposed and deformed therebetween. Supported on the top wall 63 is a drum 69 supporting a plurality of magnetic transducers 71 adapted to rotate therewith as the drum is rotated about its longitudinal axis defined by a centrally disposed shaft 70 which is supported in bearing by bearings held by upright portions 65,68 of respective brackets 64,67 which are fastened to the upper surface of top wall 63. Bracket 64 supports a constant speed electric motor 72, the output shaft of which is connected to a gear box 73 for driving drum 69 at a suitable speed while bracket 67 supports a gear motor 74, the output shaft 74S of which is connected to drive a capstan wheel 75 which engages the magnetic tape T against an idler wheel 95 rotatably supported by the wall wall of the magazine 80 in alignment with an opening 87 in the front end wall 84 of the magazine. The magazine 80 is formed with side walls 81,82, front and rear walls 83,84 and major top and bottom walls 80A and 80B.

The front end wall 84 of magazine 80 has short flat end-portions 85,86 at the ends thereof and a central portion 88 which is acruately shaped and concave to the exterior of the magazine for properly receiving and guiding a portion of the tape T in a path therealong. Although not shown, the central portion of the center portion 88 of the wall 84 may be recessed to retain the tape T centrally located therealong and such recessed portion may have a resilient strip or layer of a yieldable material such as felt or cellular flexible plastic disposed therein to yieldably support the rear surface of the tape T as it is forced thereby to conform to the surface of the drum 69 thereby. As shown in FIG. 6 the arcuate end wall 84, particularly the center portion 88 thereof is shaped to conform to the surface of the drum 69 and will therefor deform the tape to conform to the central portion of the drum at which is mounted the multiple magnetic transducers 70, the operating ends of which engage or are predeterminately disposed a short distance (less than 0.0005") of the tape as the drum rotates wherein the magnetic heads will each scan a transverse track of the tape as the tape is driven past and against the rotating drum and such tracks will extend parallel to each other so that either or both recording and reproduction functions may be performed and may be repeated with respect to the same tracks a number of times.

The tape T is received from the supply reel 90 which is rotatably supported on a hub or shaft 91 supported by the side wall 80B, then passes through an opening 85A in end wall 84 located between wall portions 85 and 88 after which it is guided by antoehr idler wheel 93, along wall portion 88 to another idler wheel 94 then through a second opening 86A around a depressor idler wheel 75 against which it is compressed by the capstan wheel 75 for driving same to a take-up reel 96.

In the embodiments of the invention illustrated in FIGS. 1-6 it is noted that a thin film of air may be provided between the tape and the drum which supports the transducers to prevent actual contact of the tape with the rotating drum. Such air film may be provided by a blower supported in the transducing apparatus housing and ejected either from the transducer drum or a suitable nozzle or orifice provided in the top wall 12 at a suitable location to direct the air between the tape and rotating drum and or the tape and the arcuately formed portion of the maga zine housing. The air film may also be formed from boundary layer air existing along the surface of the drum as it rotates.

I claim:

1. Magnetic tape transducing apparatus comprising in combination with a magazine containing magnetic tape, supply means for said tape and means for guiding a free length of said tape from said supply means,
   a support including means for receiving and predeterminately positioning said magazine on said support,
   take-up means for said tape,
   magnetic transducing means,
   rotatable drum means having an elongated cylindrical surface rotatably supported by said support and supporting said transducing means with the operating end of said transducing means disposed at the cylindrical surface of said rotatable drum means,
   concave arcuate surface means supported by said magazine for cooperating with said cylindrical surface of said rotatable drum means whereby the transducing means supported by said rotatable drum means may scan said tape,
   power means for rotating said rotatable drum means,
   means for driving said tape from said supply means to said take-up means while said tape is engaged against said cylindrical surface by said concave arcuate surface means and while said rotatable means rotates to cause said transducing means to transversely scan said tape and to permit said transducing means to transduce signals with respect to said tape.

2. A magnetic tape transducing means in accordance with claim 1 wherein said tape guide means is supported by said magazine.

3. A magnetic tape transducing apparatus in accordance with claim 2 wherein said concave arcuate surface tape guide means is defined by a wall of said magazine and means supported by said magazine for guiding a free length of said tape adjacent said wall containing said concave arcuate surface.

4. A magnetic transducing apparatus in accordance with claim 2 wherein said magazine is made of molded plastic resin and said arcuate surface is defined by a portion of the molded plastic of said magazine.

5. A magnetic transducing apparatus in accordance with claim 1 wherein said means for causing said tape of said magazine to conform to a portion of the cylindrical surface of said rotatable means includes a resilient material supported by said magazine.

6. A magnetic tape transducing apparatus in accordance with claim 1, said magazine being formed with an end wall, said concave arcuate surface means defined by an arcuate surface portion of said end wall and defining said means for causing said tape to longitudinally conform to said cylindrical surface of said rotatable means, and means for retaining said magazine at an operable location on said support whereby said arcuate surface portion of said magazine end wall and said cylindrical surface of said rotatable means are in conformance with each other and said tape is disposed therebetween when said magazine is operably located on said support.

7. A magnetic tape transducing apparatus in accordance with claim 1, said magazine having said means for causing said tape to longitudinally conform to the cylindrical surface of said rotatable means extending between and supported by the major side walls of said magazine.

8. A magnetic tape transducing apparatus in accordance with claim 7 wherein said means for causing said magnetic tape to conform to said cylindrical surface is an extension of a wall of said magazine.

9. A magnetic transducing apparatus in accordance with claim 7 wherein said means causing said tape to conform to the cylindrical surface of said rotatable means extends at an angle with respect to an end wall of said magazine.

10. A magnetic transducing apparatus in accordance with claim 1 wherein said rotatable means has a barrel shaped surface with a central cylindrically shaped portion supporting said transducing means for receiving and gradually deforming said tape to make it conform to the cylindrically shaped portion thereof and to guide said tape to a flat condition beyond said rotatable means.

11. Magnetic tape transducing apparatus comprising in combination with a magazine containing magnetic tape, an opening in said magazine, supply and take-up means for said tape supported by said magazine, and means for guiding said tape between said supply and take-up means past said opening in said magazine to present a length of said tape exposed to the exterior of said magazine adjacent said opening,
   a support,
   magnetic transducing means,
   a drum supporting said magnetic transducing means,
   means for rotationally supporting said drum on said support for rotation of said drum and said magnetic transducing means about the longitudinal axis of said drum,
   means supported by said support for receiving and predeterminately positioning said magazine on said support so as to locate said opening in said magazine in alignment with said drum and to dispose at least a portion of the length of said tape extending adjacent said opening against and longitudinally of said drum whereby, when the drum is rotated, it will cause said transducing means to transversely scan said tape, means for power rotating said drum and driving said tape between said supply and said takde-up means of said magazine to cause said transducing means to scan and transduce information with respect to parallel transverse tracks of said tape.

12. Magnetic tape transducing apparatus in accordance with claim 11 wherein said drum varies in diameter along its length to facilitate conformation of said tape with the surface of said drum.

13. Magnetic tape transducing apparatus in accordance with claim 12 including means for moving said magazine in a fixed path on said support to being the tape of said magazine into and out of engagement with said drum.

14. Magnetic tape transducing apparatus in accordance with claim 11 including means supported by said magazine for causing said tape to conform to the surface of said drum when said magazine is operatively rotated with respect to said drum.

* * * * *